United States Patent
Ken-Dror

(10) Patent No.: US 11,068,926 B2
(45) Date of Patent: Jul. 20, 2021

(54) SYSTEM AND METHOD FOR ANALYZING AND PREDICTING EMOTION REACTION

(71) Applicant: EMM PATENTS LTD., Even Yehuda (IL)

(72) Inventor: Eli Ken-Dror, Herzlia (IL)

(73) Assignee: EMM PATENTS LTD., Even Yehuda (IL)

( * ) Notice: Subject to any disclaimer, the term of this patent is extended or adjusted under 35 U.S.C. 154(b) by 358 days.

(21) Appl. No.: 15/275,878

(22) Filed: Sep. 26, 2016

(65) Prior Publication Data

US 2018/0089715 A1 Mar. 29, 2018

(51) Int. Cl.
*G06Q 30/02* (2012.01)
*G06F 16/332* (2019.01)
*G06F 16/9535* (2019.01)
*G06F 40/30* (2020.01)

(52) U.S. Cl.
CPC ..... *G06Q 30/0242* (2013.01); *G06F 16/3326* (2019.01); *G06F 16/9535* (2019.01); *G06F 40/30* (2020.01)

(58) Field of Classification Search
CPC ...................... G06Q 30/0242; G06Q 30/0235
USPC ...................................................... 705/14.41
See application file for complete search history.

(56) References Cited

U.S. PATENT DOCUMENTS

| | | | |
|---|---|---|---|
| 8,510,248 B2* | 8/2013 | Koren | G06N 5/046 706/46 |
| 2012/0143693 A1* | 6/2012 | Chung | G06Q 30/0241 705/14.66 |
| 2014/0108309 A1* | 4/2014 | Frank | G06N 99/005 706/12 |
| 2014/0195610 A1* | 7/2014 | Ken-Dror | G06Q 50/01 709/204 |
| 2014/0323817 A1* | 10/2014 | el Kaliouby | A61B 5/165 600/300 |
| 2014/0330649 A1* | 11/2014 | Lyren | G06Q 30/0277 705/14.66 |

* cited by examiner

*Primary Examiner* — Azam A Ansari
(74) *Attorney, Agent, or Firm* — Browdy and Neimark, P.L.L.C.

(57) ABSTRACT

The present invention provides a method for identifying trends and correlation of content items characteristics in relation to user emotional reaction. The method comprising the steps of: receiving plurality of rating/votes originated by different users relating one or more content item, wherein the user is required to selection emotion icon from multiple choice emotion icons, analyzing statistics of users selections by identifying characteristics of the news/article item, including at least one of; timing of news item publication, subject of content item, source/writer of the content, context of the content, style of content, key words/image appearing in the content and identifying correlations of content item characteristics in relation user emotion reaction according to the said analysis identifying trends.

17 Claims, 12 Drawing Sheets

300 | Dashboard module

| | |
|---|---|
| Create tables/graph presenting emotion/emotion response or state in relation content items characteristics according to pre-defined rules or based on identified correlation | 310 |
| Create tables/graph presenting emotion response in relation to content item publication time periods | 320 |
| Create tables/graph presenting emotion response in relation to engagement or user behavior data | 330 |
| Create data presentation showing in real time data relating users emotion in relation to content items | 340 |
| Create data presentation showing emotion data in association to content authors/ content creators | 350 |
| Create data presentation showing emotions rating in real-time | 360 |
| Create data presentation showing in real time viewing statistics in relation to emotions correlations | 370 |

Figure 4

| 500 | Prediction module |

| Estimating engagement or ads clicking rating of content types based on statistical analysis user emotion reactions in relation to content item characteristics | 510 |

| Estimating optimal content item publication time periods based on emotion responses analysis | 520 |

| Estimating optimal content page location based on the emotional inputs and predict best page content location | 530 |

| Estimating recommended exposure time based on measured user emotions | 540 |

Figure 6

SYSTEM AND METHOD FOR ANALYZING AND PREDICTING EMOTION REACTION

BACKGROUND

Technical Field

The present invention relates to the field of reaction emotion analysis and more specifically organization prediction of user behavior based on emotion reaction in relation to website content.

BRIEF SUMMARY

The present invention provides a method for identifying trends and correlation of content items characteristics in relation to user emotional reaction. The method comprising the steps of: receiving plurality of rating/votes originated by different users relating one or more content item, wherein the user is required to selection emotion icon from multiple choice emotion icons, analyzing statistics of users selections by identifying characteristics of the news/article item, including at least one of; timing of news item publication, subject of content item, source/writer of the content, context of the content, style of content, key words/image appearing in the content and identifying correlations of content item characteristics in relation user emotion reaction according to the said analysis identifying trends.

The present invention provides a method for managing content items publication within communication network. The method comprising the steps of
- receiving plurality of emotion reactions, rating or votes originated by different users relating one or more content item through time;
- analyzing statistics of users reactions in relation to characteristics of the content item, including at least one of; timing of content item publication, subject of content item, source/writer of the content, context of the content, style of content, key words/image appearing in the content; and
- clustering content item by identifying correlations of content item characteristics in relation user emotion reaction according to the said emotion statistics analysis;
- managing content item publication, by selecting content type, determining publication time or determining exposure time According to some embodiments of the present invention, the method further comprising the steps of:
predicting engagement and ads clicking rating of content items based content items clustering and correlation of content items characteristics in relation to user emotional reaction, wherein the content items management is based on said predictions.

According to some embodiments of the present invention the method further comprising the steps of:
Estimating optimal content item publication time periods based on emotion responses analysis in relation to content item characteristics, wherein the content items management is based on said estimation.

The present invention provides a method for publish timing and selecting content items in a web page, the method comprising the steps of:
receiving plurality of emotional rating/votes originated by different users relating one or more content item, wherein the user is required to selection emotion icon from multiple choice emotion icons;
analyzing statistics of users selections by identifying characteristics of the content item, including at least one of; timing of news item publication, subject of content item, source/writer of the content, context of the content, style of content, key words/image appearing in the content; and
recommending of content items and timing of publication according to the said analysis.

According to some embodiments of the present invention the method further comprising the steps of:
Context text analysis of content items, identify trending topics, analyzing behavior patterns of different users in relation to common content items and content item clustering based on the context text analysis and behavior pattern analysis, wherein said context analyzing data is added to content item characteristics.

According to some embodiments of the present invention the method further comprising the step of predicting time period exposer of content of content item based on measured emotion in relation to content item characteristics reaction, wherein exposure period provide estimation to the content provider how much time to keep the content exposed to the user or promoting said content item, wherein the content items management is based on said predictions.

According to some embodiments of the present invention the method further comprising the step of predicting user emotion reaction, where the user's didn't provide such reaction based on analyzed emotion reactions to sequence of reading content items of other users, which expressed their emotion.

According to some embodiments of the present invention the method further comprising the step of adapt advertising type based on prediction of the emotional state or mood which predict adverting success rate based on measured user emotions.

The present invention provides a system for managing content item publication in communication network, said system comprised of:
Emotion measurement module for receiving plurality of emotion reactions originated by different users relating one or more content item;
Emotion analyzing module analyzing statistics of users reactions in relation to characteristics of the content item, including at least one of; timing of news item publication, subject of content item, source/writer of the content, context of the content, style of content, key words/image appearing in the content and clustering content item by identifying correlations of content item characteristics in relation user emotion reaction
Content wizard module for managing content item publication, by selecting content type, determining publication time or determining exposure time.

At least one of receiving, analyzing, clustering or managing is performed by at least one processor According to some embodiments the systems further comprising prediction module for predicting engagement and ads clicking rating of content items based on correlation of content items characteristics in relation to user emotional reaction, wherein the content items management is based on said predictions.

According to some embodiments the systems further comprising prediction module for estimating optimal content item publication time periods based on emotion responses analysis in correlation of content items characteristics, wherein the content items management is based on said predictions.

According to some embodiments the systems the context analyzing module further comprises context text analysis of content items, identify trending topics, analyzing behavior patterns of different users in relation to common content items or article clusters and article clustering based on the context text analysis and behavior pattern analysis, wherein the content items management is based on said predictions. According to some embodiments the systems further comprising prediction module for predicting time period exposer of content of content item based on measured emotion in relation to content item characteristics reaction, wherein exposure period provides estimation to the content provider how much time to keep the content exposed to the user or promoting said content item, wherein the content items management is based on said predictions.

According to some embodiments the systems further comprising prediction module predicting user emotion reaction, where the user's didn't provide such reaction based on analyzed emotion reactions to sequence of reading content items of other users, which expressed their emotion, wherein the content items management is based on said predictions. According to some embodiments the systems further comprising prediction module for determining advertising type or/and advertising optimal publication time based on prediction of the emotional state or mood which predict advertising success rate based on measured user emotions.

BRIEF DESCRIPTION OF THE DRAWINGS

The present invention will be more readily understood from the detailed description of embodiments thereof made in conjunction with the accompanying drawings of which:

FIG. 4 is a flow chart illustrating the processing of dashboard according to some embodiments of the invention;

FIG. 6 is a flow chart illustrating the processing of prediction module, according to some embodiments of the invention;

DETAILED DESCRIPTION

Figure 1:
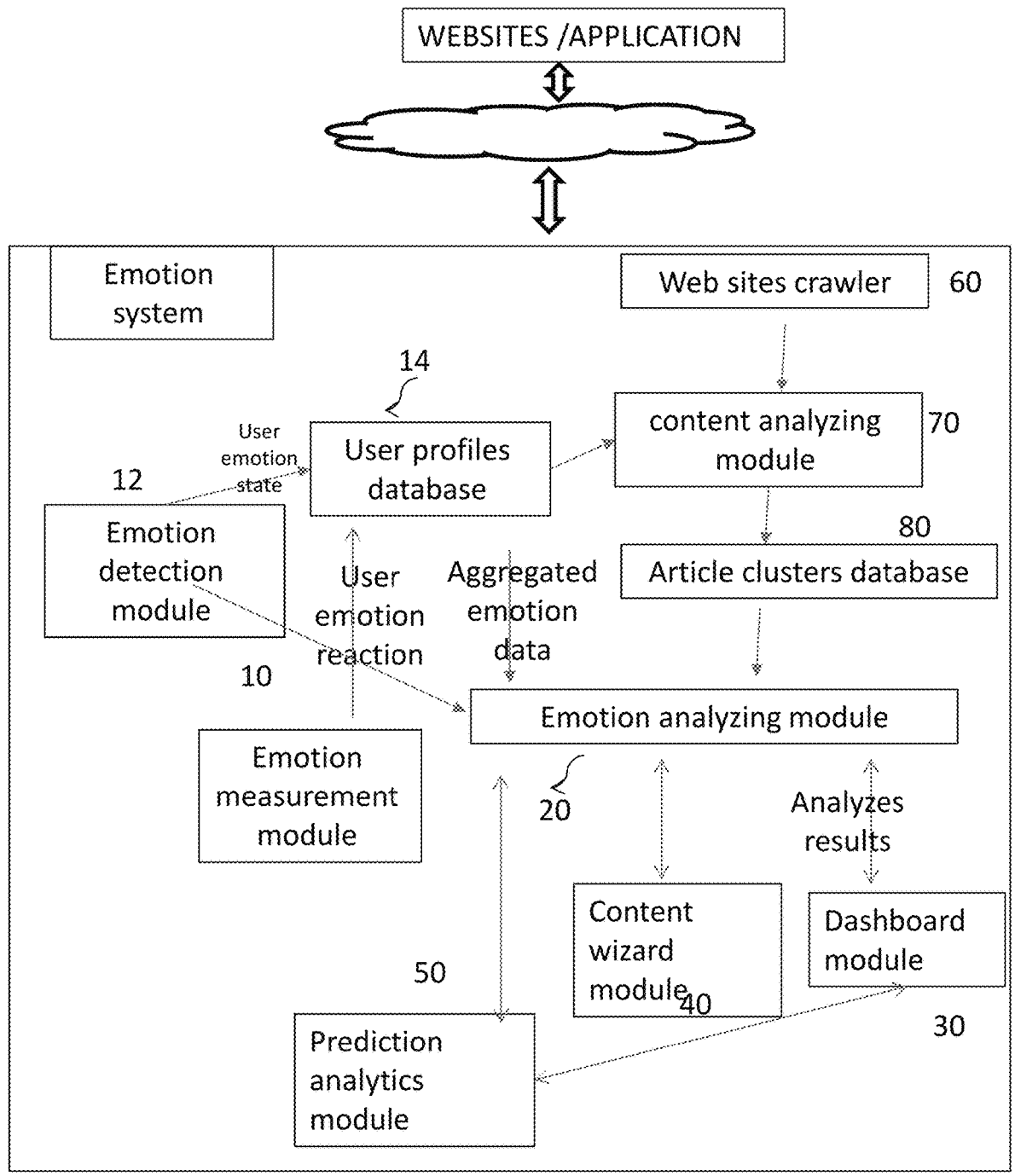
FIG. 1 is block diagram illustrating the emotion system according to some embodiments of the invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The term "content item" as referred in this application, include any type of electronic content or multimedia object include: text, video, image. The content item may an advertisement published with other content items.

The present invention provides a method for managing content items publication within communication network, by receiving plurality of emotion reactions, rating or votes originated by different users relating one or more content item through time, analyzing statistics of users reactions in relation to characteristics of the content item, including at least one of; timing of content item publication, subject of content item, source/writer of the content, context of the content, style of content, key words/image appearing in the content, clustering content item by identifying correlations of content item characteristics in relation user emotion reaction according to the said emotion statistics analysis and managing content item publication, by selecting content type, determining publication time or determining exposure time.

FIG. 1 is block diagram illustrating the content management system according to some embodiments of the invention. The content management system is comprised of emotion reaction measurement module 10 and/or motion detection 12 enable to measure user emotional reaction or detect motion state in relation to content item such as news article, video or image which update user profile data serving as basis for emotion analysis module 20, for statistical analysis of aggregated emotional reaction measurement. The emotional analysis provides analytical results for the following modules:

Dashboard module 30 for creating visual presentation of the analytical results in relation content items;

Content wizard module 40 for assisting content editors of web sites to create, manage and select content items, determine publication and exposure time period;

Prediction module 50 for estimating engagement or rating of different type of content items and estimation optimal publication timing of content items. Optionally the prediction module may provide estimating recommended exposure time of the content item or suggestion to related content items.

According to some embodiment of the present invention, the systems provides web crawler for aggregating content item, such as articles, image or video, the content items are analyzed by content analysis module 60 in association to user emotional profiles, creating articles clusters database 70. The article cluster database support the emotional analysis performed in module 20.

The emotion reaction measurement module 10 and/or motion detection 12 may be implemented by software modules or hardware components, which monitor user behavior or receive feedback from the user which can select emotion icons or by sensors, such as camera or bios-sensor which enable to detect user mood.

Figure 2:
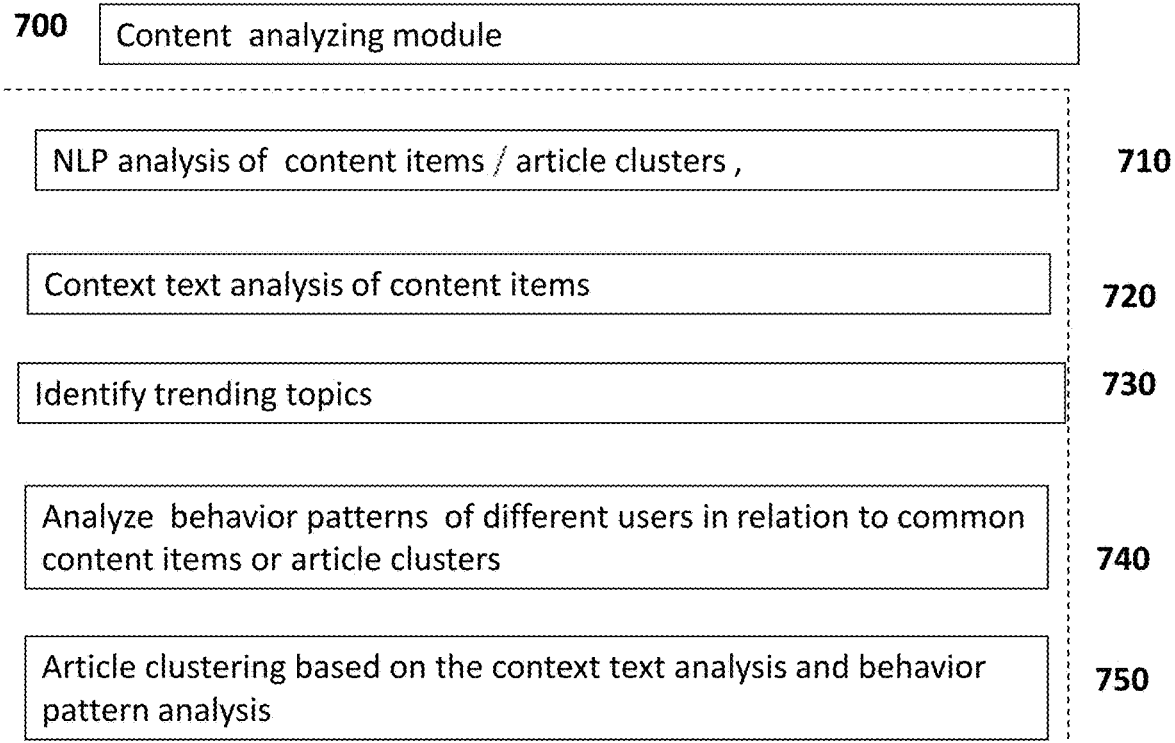
FIG. 2 is a flow chart illustrating the process of content analyzing module, according to some embodiments of the invention.

FIG. 2 is a flow chart illustrating the process of content analyzing module, according to some embodiments of the invention. The content analysis module include at least one of the following steps: Context text analysis of content items (step 710), identify trending topics by measuring popularity of the topic (step 720), analyzing behavior patterns of viewing content, engagement, interaction, exposure, clicking activity of different users in relation to common content items or article clusters (step 730) and article clustering based on the context text analysis and behavior pattern analysis (step 740). The results of theses context analysis provide more characteristics to the content item.

Figure 3:
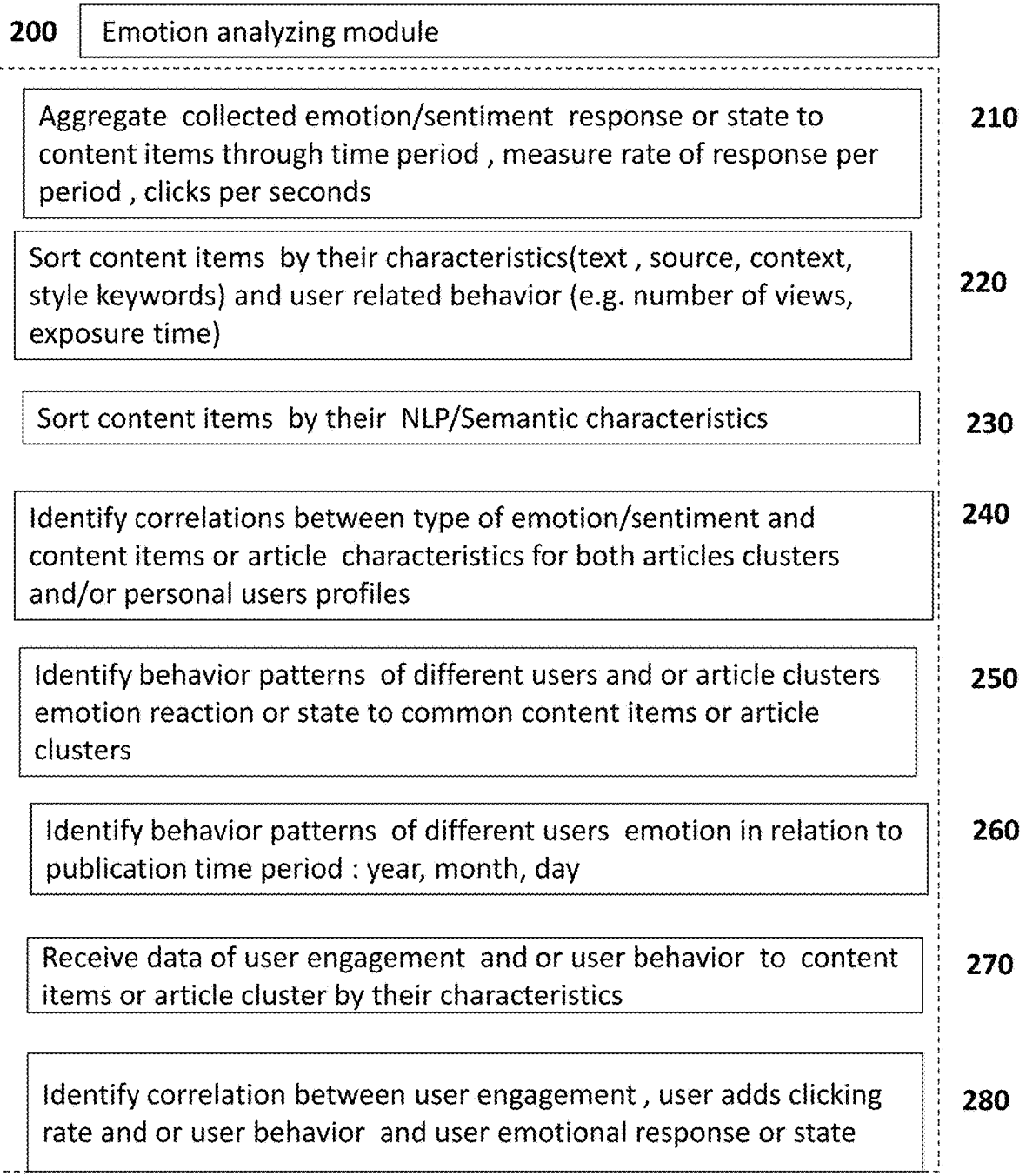
FIG. 3 is a flow chart illustrating the process of Emotion analyzing module, according to some embodiments of the invention.

FIG. 3 is a flow chart illustrating the process of Emotion analyzing module, according to some embodiments of the invention. The emotional analysis module include at least one of the following steps:

Create tables/graph presenting emotion response in relation content items characteristics through time according to pre-defined rules or based on identified correlation (step 210), Sort content items by their characteristics (source, context, style keywords) (step 220), Sort content items by their NLP/Semantic characteristics (step 230), Identify correlations between type of emotion/sentiment and content items or article characteristics for both articles clusters and/or personal user's profiles (step 240), Identify behavior patterns of different users emotion reaction to common content items (step 250), Identify behavior patterns of different user's emotion in relation to content item characteristics such as, type of content, content subject, publication time period: year, month, day (step 260), Receive data of user engagement and/or user behavior to content items by their characteristics (step 270) and Identify correlation between user engagement, user clicking rate on ads or user behavior and user emotional response or state/mood. (step 280), clustering content items according to identified correlations of emotion reaction in relation to type publication timing or exposure;

FIG. 4 is a flow chart illustrating the processing of dashboard according to some embodiments of the invention. The dashboard module include at least one of the following steps: create tables or graph which represent emotion rating in relation content items characteristics according to pre-defined rules or based on identified correlation between different characteristics and emotion rating (step 310), Create tables/graph presenting emotion response in relation to content item publication time periods (step 320), Create tables/graph presenting emotion response in relation to content item publication time periods (step 330), Create tables/graph presenting emotion response in relation to content item publication time periods (step 340), Create data presentation showing emotion data in association to content authors/content creators (step 350), Create data presentation showing emotions rating in real-time (step 360) and/or Create data presentation showing in real time viewing statistics in relation to emotions correlations (step 370).

Figure 5:
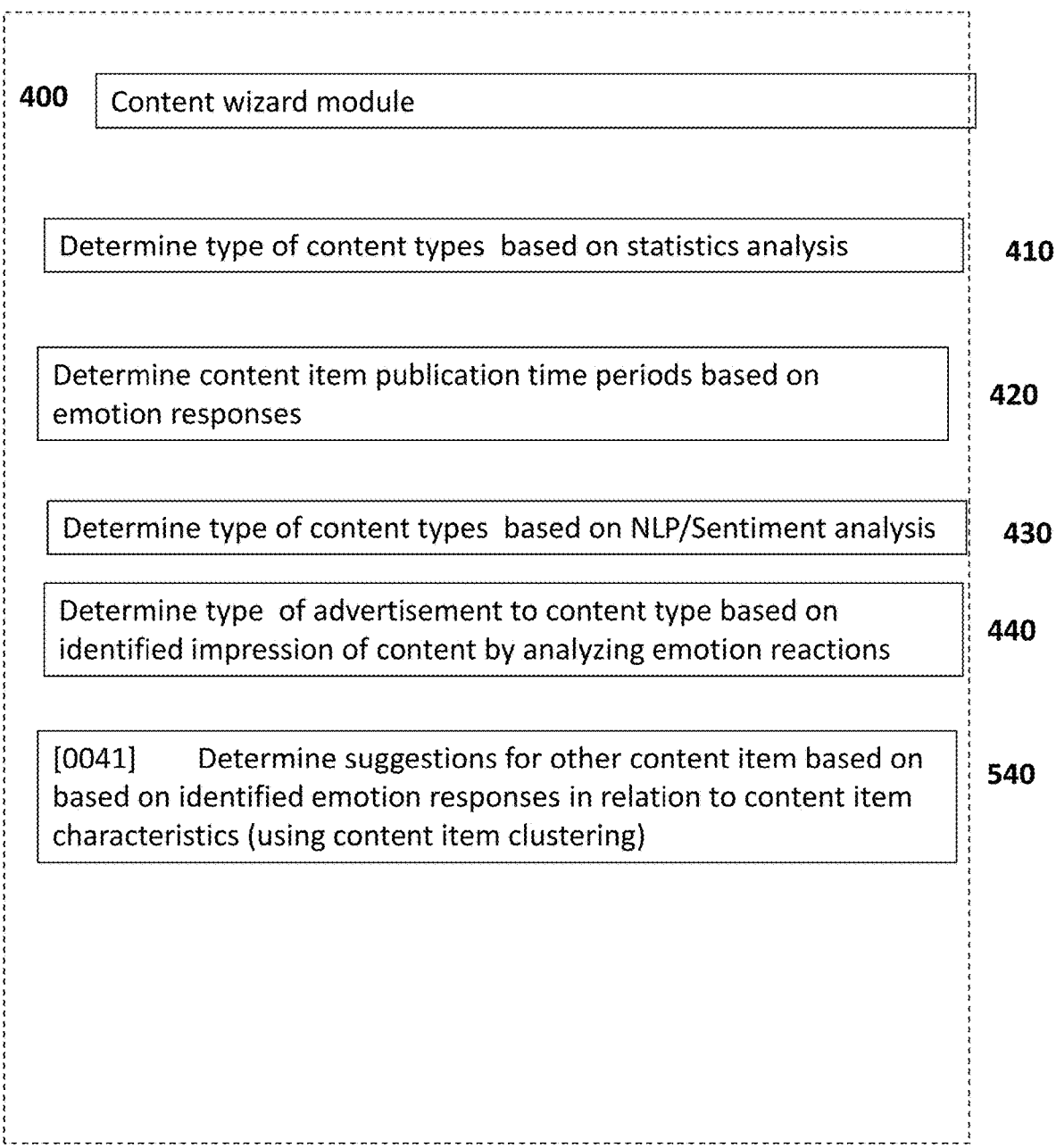
FIG. 5 is a flow chart illustrating the processing of content wizard, according to some embodiments of the invention.

FIG. 5 is a flow chart illustrating the processing of content wizard, according to some embodiments of the invention. The content wizard module include at least one of the following steps:

supporting the user content management to determine type of content types based on statistical analyze, prediction of estimated emotional status or mood of the users in relation to content item characteristics (using content item clustering) (410), Determine content item publication time periods or exposure based on identified emotion responses in relation to content item characteristics (using content item clustering) (step 420), Determine type of content types based on NLP/Sentiment analysis (step 430).

Determine targeted recommended advertising and optimal publication time (such as time of day, or week) based on identified emotion responses in relation to content item characteristics (using content item clustering) (step 440), Determine suggestions for other content item based on based on identified emotion responses in relation to content item characteristics (using content item clustering) (step 450).

FIG. 6 is a flow chart illustrating the processing of prediction module, according to some embodiments of the invention. The prediction module includes at least one of the following steps:

Estimating engagement, suggestions for other content item or ads clicking rating of content types, based on statistical analysis of user emotion reactions in relation to content item characteristics and content item clustering (step 510), estimating optimal content item publication time periods based on emotion responses analysis in relation to content item characteristics (using content item clustering (step 520), estimating optimal content page location based on the emotional reactions and predict best page content location step (530) by analyzing content in relation to content item characteristics;

estimate recommended exposure time period of content item based on content item based emotion responses in relation to content item characteristics (step 530).

estimate recommended content type or topics based on content item emotion responses in relation to the characteristics of content items previously viewed.

All this estimations are process for providing suggestions and parameters to the content wizard module for enhancing content management.

Figure 7:
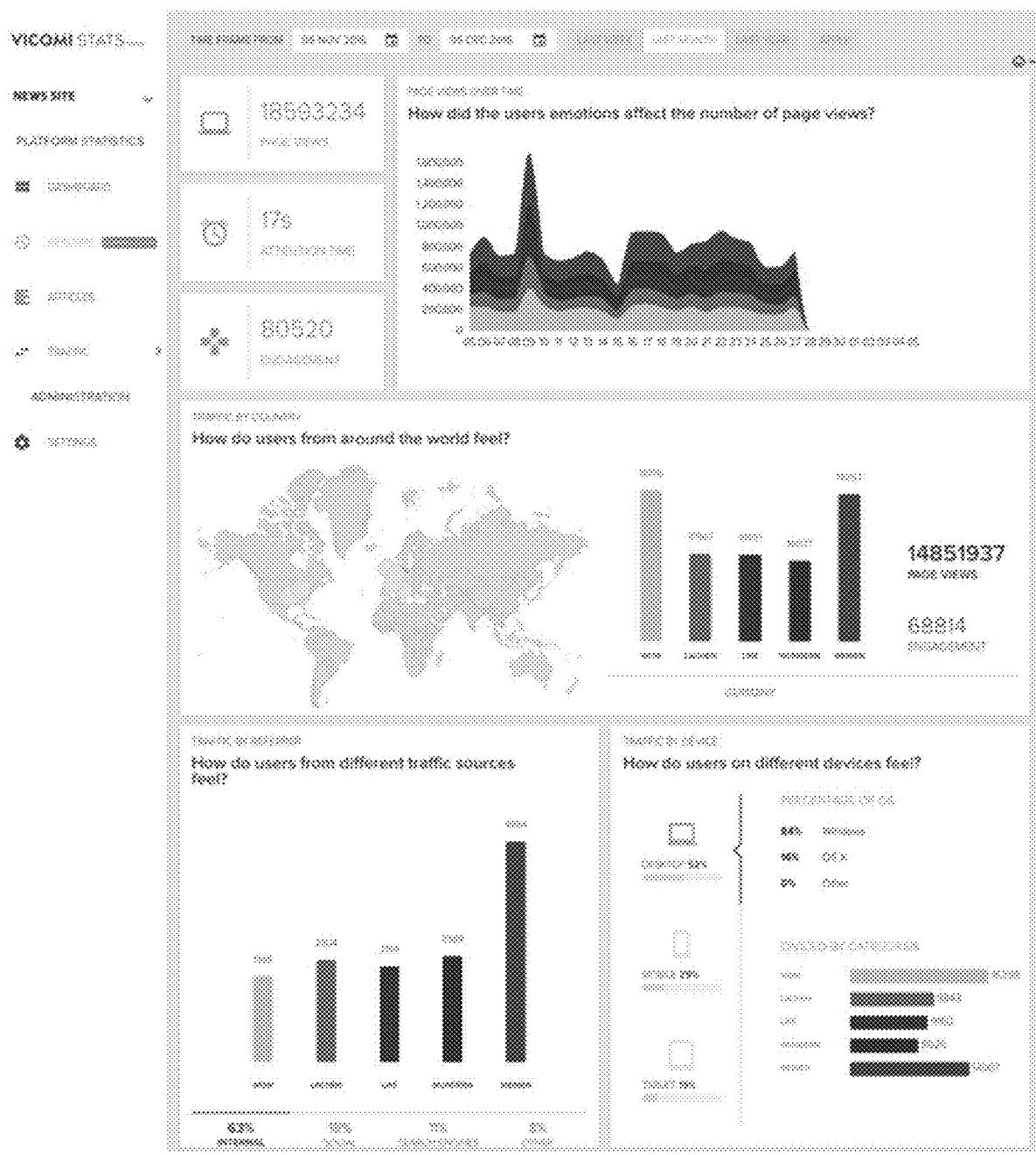
FIG. 7 is illustrate an example of dashboard presentation showing statistical data of emotion effect in relation to content data or characteristics according to some embodiments of the invention.
Figure 8:
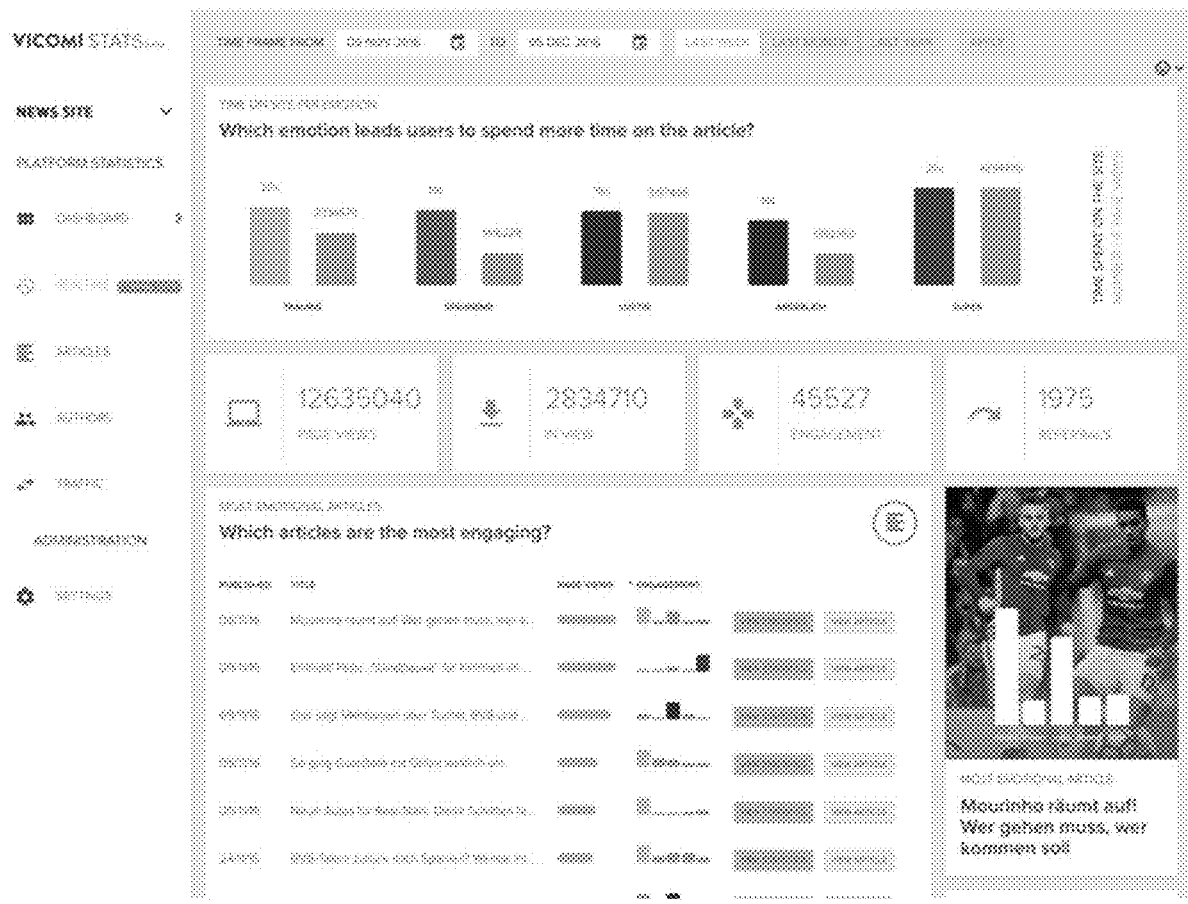
FIG. 8 is illustrate an example of dashboard presentation showing statistical data of emotion effect in relation to content data or characteristics according to some embodiments of the invention.

FIG. 7 illustrates an example of dashboard presentation showing statistical data of emotion effect in relation to content data or characteristics according to some embodiments of the invention. This dashboard presentation provides the following indications:

graph of users different emotion types, effect on pages views;

clustered view of user emotion based on geographical origin of users;

clustered view of user emotion based on users source;

FIG. 8 illustrates an example of dashboard presentation showing statistical data of emotion effect in relation to content data or characteristics according to some embodiments of the invention. This dashboard presentation provides the following indications:

Graph showing correlation between user emotion, engagement statistics and publication date or time, giving indication/recommendation for best publishing time.

Graph showing correlation between user emotions, engagement statistics and articles creators/authors.

Figure 9:
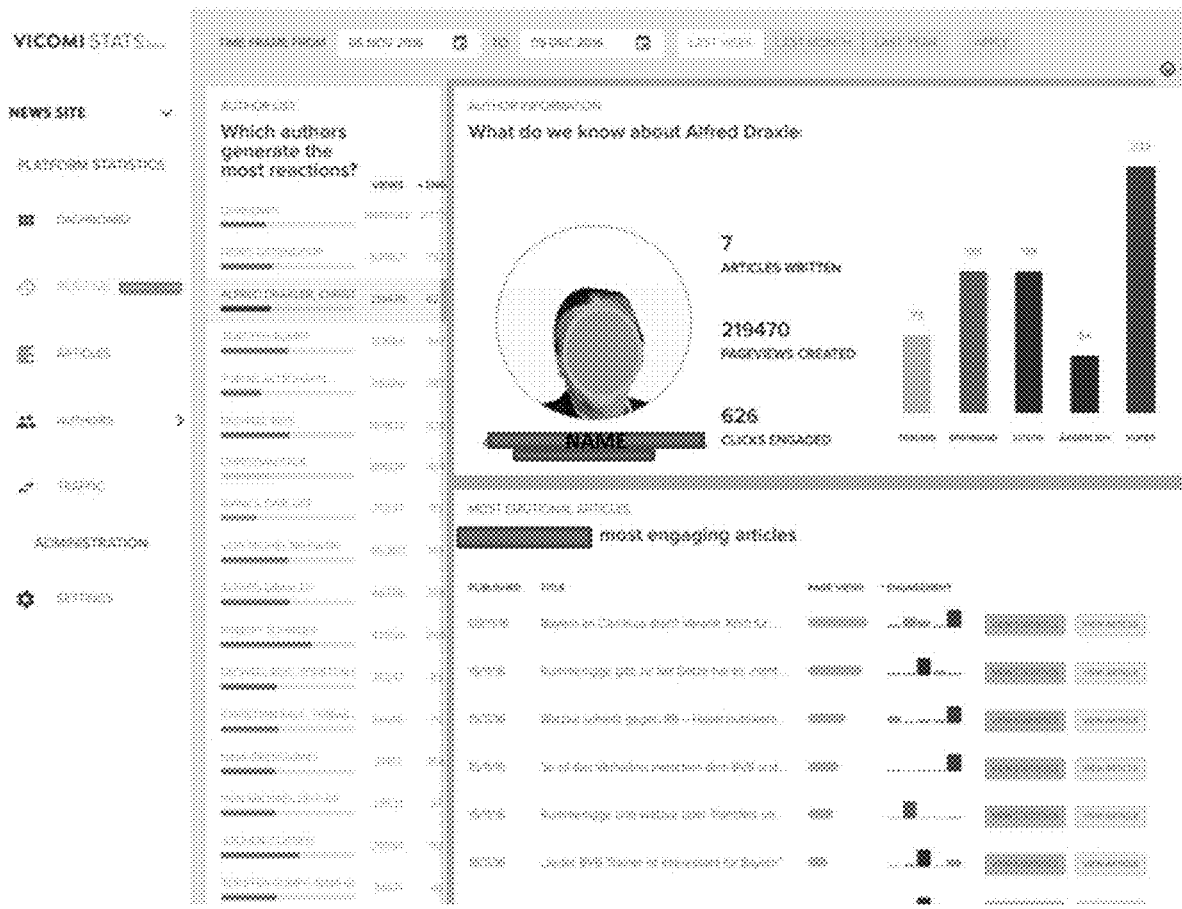
FIG. 9 is illustrate an example of dashboard presentation showing statistical data of content authors in relation to content data or characteristics according to some embodiments of the invention.

FIG. 9 illustrates an example of dashboard presentation showing statistical data of emotion effect in relation to content data or characteristics according to some embodiments of the invention. This dashboard presentation provides the following indications.

Figure 10:
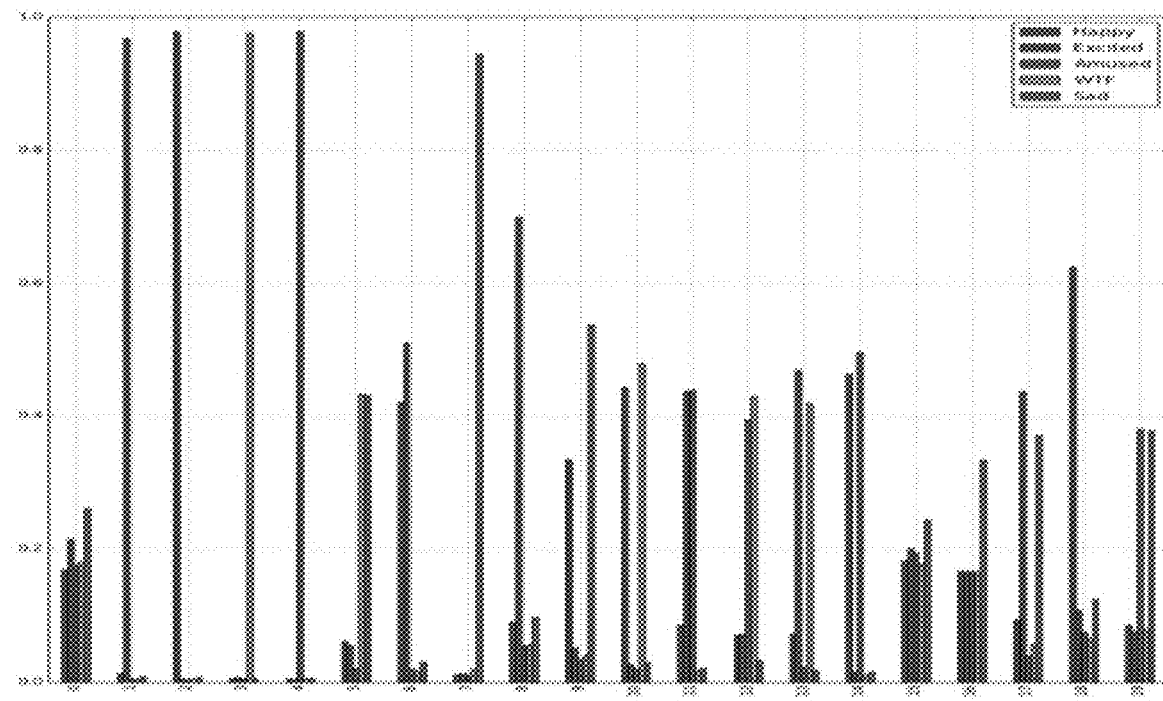
FIG. 10 is illustrate an example of dashboard presentation showing statistical data of emotion clustering groups according to some embodiments of the invention.
Figure 11:
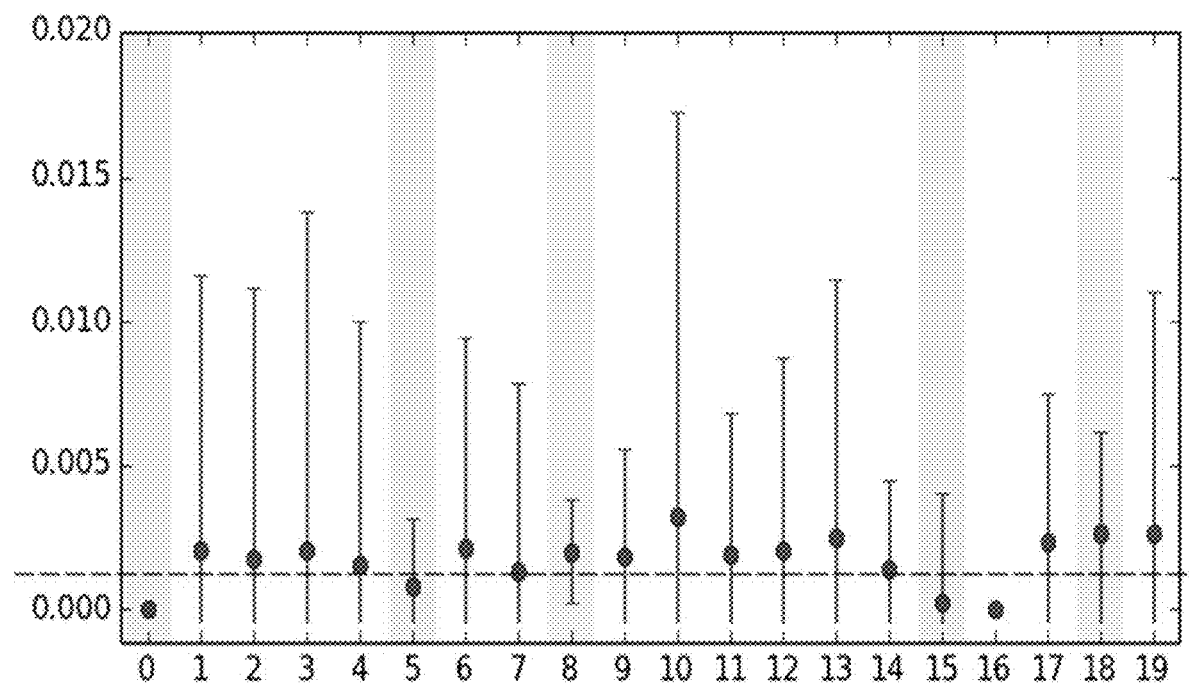
FIG. 11 is illustrate an example of dashboard presentation showing statistical data of correlation between ads click and emotion cluster groups according to some embodiments of the invention.

FIG. 10 illustrates an example of dashboard presentation showing statistical data of emotion clustering groups, according to some embodiments of the invention;

FIG. 11 illustrates an example of dashboard presentation showing statistical data of correlation between ads click and emotion cluster groups, according to some embodiments of the invention.

Figure 12:
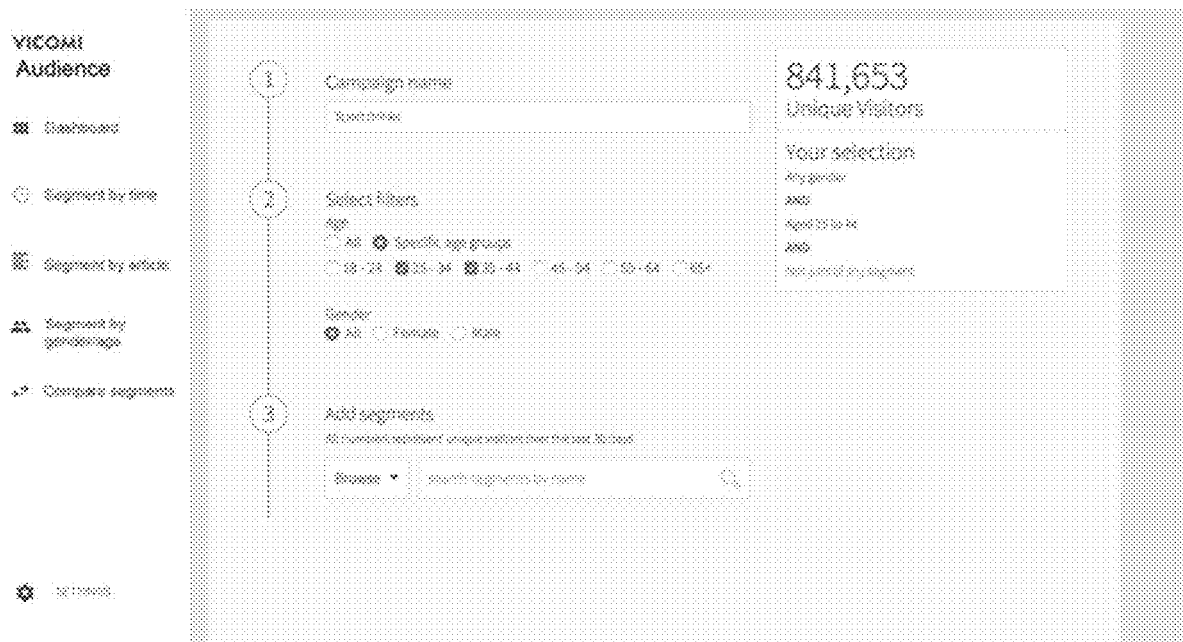
FIG. 12 is illustrate an example of dashboard presentation correlating campaign and profile data of users according to some embodiments of the invention.

FIG. 12 illustrates an example of presentation correlating campaign and profile data of users according to some embodiments of the invention.

According to some embodiments of the present invention the present invention provides a prediction tool enabling to adapt advertising type based on prediction of content item emotional state or mood which predict adverting success rate based on user emotions.

The prediction of clicking success rate may be implemented by applying a random forest learning algorithm or similar algorithms in order to predict whether the characteristics of content item is likely to generate an ad-click or not. The characteristics feature vector is composed of information about the article itself—such as the rank of the cluster it belongs to (as computed by the clustering process), the age of the article, the amount of impressions it has already received, the rate of change in voting, etc.—and more general information such as current time, day of the week, etc.

Random forests or random decision forests algorithm are learning method for classification, regression which construct a multitude of decision trees at training time and outputting the class that is the mode of the classes (classification) or mean prediction (regression) of the individual trees.

According to some embodiment the present invention provides prediction of time period exposer of content of content item which provide estimation to the content provider how much time to keep the content exposed to the user or promoted. For example, a news time of current event may be relevant just for few hours, for day or for weeks. By analyzing the content item characteristics based on analyzing user emotion, the content item can be clustered by its life time.

The prediction of engagement, ads clicking rate or exposure may further based in geographic or cultural characteristic's of the of the published content and/or the users.

According to some embodiments of the present invention, the content provider is provided with prediction of what type of content to write for getting the required characteristics which reflect state of emotion or mood of the users.

According to some embodiments of the present invention it is suggested to identify mood impact trend on content type characteristics for predicting the content type for more clicking rates.

According to some embodiments of the present invention the user reactions of clicking on emotion icons or and clicking ads is analyzed based on time analysis, measuring number of clicks per time period, such as clicks per minutes, or hours, analyzing the clicking rate, for providing an enhanced estimation for providing more accurate prediction of adds clicking rate, prediction of preferred content type or better publishing time or exposure.

According to some embodiments, its recommended to measure attention time (attention time is being measured as actual time that the user is active on session) for content item and number of view, analyze these data in relation to emotional analysis of the content item and ads clicking rate. Analyzing theses correlations can be used for better content selection based on content characteristics.

According to some embodiments of the present invention is suggested to analyze number of views of content item in relation to geographic location of the users and publishing time, in relation to measured emotion ads clicking rate for recommending According to some embodiments of the present invention is suggested to analyze Clustering change of an article content during time period and measuring distance between emotional changed clusters. For example, once an article was published it received negative emotion, but over time the opinion or attitude of the user has change and the article receive more moderate emotion response or positive one. The analysis of these changes provide enhanced predictions of type content to be published, exposure time of content or timing of publication.

According to some embodiments of the present invention, it is suggested to predict user emotion reaction, where the user's didn't provide such reaction based on analyzed emotion reactions to sequence of reading content items of other users, which expressed their emotion having the same sequence/pattern of reading.

According to some embodiments of the present invention is suggested to further analyze user emotion relation to content item characteristic based on user profiling, which can be identified or aggregated using cookies sync, tracking user reaction to plurality of content items or profiles provided by third parties.

According to some embodiments, the content item may be dynamic content item, which include multiple articles, which relate to the same issue published at different times, such as news events items published at different time periods.

The system of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software.

Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

i. It is to be understood that the phraseology and terminology employed herein is not to be construed as limiting and are for descriptive purpose only.

ii. The principles and uses of the teachings of the present invention may be better understood with reference to the accompanying description, figures and examples.

iii. It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not to be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A method for managing content items publication within communication network, said method implemented by one or more processing devices operatively coupled to a non-transitory storage device, on which are stored modules of instruction code that when executed cause the one or more processing devices to perform:

receiving a plurality of emotion reactions, rating or votes originated by different users relating to one or more content item through time presented to the users through a graphical user interface, wherein the receiving of the user emotion reactions, rating, or votes is achieved by monitoring user behavior or by receiving feedback from the user who can select emotion icons or by sensors which enable detection of user mood, wherein for each user is associated a personal profile, the personal profile comprising information aggregated using personal data sync for identifying the user within the communication network;

analyzing statistics of reactions of users in relation to characteristics of the content item, including periodic timing schedule of content item publication and estimating engagement or rating of different types of content items, and at least one of: subject of content item, source/writer of the content, context of the content, style of content, key words/image appearing in the content, wherein the user personal profile is updated according to characteristics of user emotional state in relation to periodic timing schedule;

clustering content item by identifying correlations of content item characteristics in relation to user emotion reaction according to the said emotion statistics analysis;

performing NLP or sentiment analysis of user emotion reaction;

managing and optimizing content items publication on the communication network, by selecting content type based on NLP or sentiment analysis of content and emotion responses of a plurality of users, and determining a publication time schedule throughout a periodic time including at least one of time of day, or day of a week, or week of or a month of a year on the communication network based on user personal profile of emotion state in relation to schedule timing and determining exposure time on the communication network based on the emotion responses of the plurality of users wherein the optimization of selection of content type and estimation of optimal publication timing of content items is based on estimating engagement or rating of different types of content items; and estimating optimal content items publication exposure time period which determines how much time to keep each content item exposed to the users, based on emotion responses analysis in relation to content item characteristics, wherein the content items management is based on said estimation, wherein the exposure time period and publication time determine automatic scheduling of publishing of each content item including start and end time of publishing each content item which is optimized based on the content type and sentiment analysis of content and emotion responses of the users.

2. The method of claim 1 further comprising the step of predicting engagement and ads clicking rating of content items based on content items clustering and correlation of content items characteristics in relation to user emotional reaction, wherein the content items management is based on said predictions.

3. The method of claim 1 further comprising the steps of: context text analysis of content items, analyzing based on NLP the content type, identify trending topics, analyzing behavior patterns of different users in relation to common content items and content item clustering based on the context text analysis and behavior pattern analysis, wherein said context analyzing data is added to content item characteristics.

4. The method of claim 1 further comprising the step of predicting time period of exposure of content of content item based on measured emotion in relation to content item characteristics reaction, wherein exposure period provides estimation to the content provider how much time to keep the content exposed to the user or promoting said content item;

wherein the content items management is based on said predictions.

5. The method of claim 1 further comprising the step of predicting user emotion reaction, where the users didn't provide such reaction based on analyzed emotion reactions to sequence of reading content items of other users, which expressed their emotion.

6. The method of claim 1 further comprising the step of adapt advertising type based on prediction of the emotional state or mood which predict adverting success rate based on measured user emotions.

7. The method of claim 1 further comprising the step of analyzing the user reactions of clicking on emotion icons or clicking ads based on time analysis, measuring number of clicks per time period, or analyzing the clicking rate, for providing an enhanced estimation, and predicting preferred content type or exposure based on the enhanced estimation provided by analyzing the user reactions.

8. The method of claim 1 further comprising the step of providing the content provider with prediction of what type of content to write for getting required characteristics which reflect state of emotion or mood of the users.

9. The method of claim 8 further comprising the step of identifying mood impact trend on content type characteristics for predicting the content type for more clicking rates.

10. The method of claim 1 further comprising the step of analyzing clustering change of an article content during a time period and measuring distance between emotional changed clusters for providing enhanced predictions of type of content to be published, exposure time of content or timing of publication.

11. A method for timing publication and selecting content items or advertisements in a web page, said method implemented by one or more processing devices operatively coupled to a non-transitory storage device, on which are stored modules of instruction code that when executed cause the one or more processing devices to perform:

receiving a plurality of emotional rating/votes originated by different users relating to one or more content item presented to the users through a graphical user interface, wherein the user is required to select an emotion icon from multiple choice emotion icons, wherein the receiving of the emotional rating/votes is achieved by monitoring user behavior or by receiving feedback from the user who can select emotion icons or by sensors which enable detection of user mood, wherein for each user is associated a personal profile, the personal profile comprising information aggregated using personal data sync for identifying the user within the communication network;

analyzing statistics of selections of users by identifying characteristics of the content item, including periodic timing schedule of news item publication and estimating engagement or rating of different types of content items, and at least one of: subject of content item, source/writer of the content, context of the content, style of content, key words/image appearing in the content, wherein the user personal profile is updated according to characteristics of user emotional state in relation to periodic timing schedule;

performing NLP or sentiment analysis of user emotion reaction;

based on NLP or sentiment analysis of content and emotion responses of a plurality of users, recommending of content items, and timing of publication schedule throughout a periodic time including at least one of time of day, or day of a week, or week of or a month of a year, according to the said analysis, based on user personal timing profile of emotion state in relation to schedule timing and determining exposure time on the communication network based on the emotion responses of the plurality of users wherein the optimization of selection of content type and estimation of optimal publication timing of content items is based on estimating engagement or rating of different types of content items; and estimating optimal content items publication exposure time period which determines how much time to keep each content item exposed to the users, based on emotion responses analysis in relation to content item characteristics, wherein content items management is based on said estimation, wherein the exposure time period and publication time determine automatic scheduling of publishing of each content item including start and end time of publishing each content item which is optimized based on the content type and sentiment analysis of content and emotion responses of the users.

12. A system for managing content item publication in communication network, said system comprising a non-transitory storage device and one or more processing devices operatively coupled to the storage device on which are stored modules of instruction code executable by the one or more processors; said system comprised of:

emotion measurement module for receiving a plurality of emotion reactions originated by different users relating to one or more content item presented to the users through a graphical user interface, wherein the receiving of the user emotion reactions is achieved by monitoring user behavior or by receiving feedback from the user who can select emotion icons or by sensors which enable detection of user mood, wherein for each user is associated a personal profile, the personal profile comprising information aggregated using personal data sync for identifying the user within the communication network;

emotion analyzing module analyzing statistics of reactions of users in relation to characteristics of the content item, including periodic timing schedule of news item publication and estimating engagement or rating of different types of content items, and at least one of: subject of content item, source/writer of the content, context of the content, style of content, key words/image appearing in the content, wherein the user personal profile is updated according to characteristics of user emotional state in relation to periodic timing schedule, and clustering content item by identifying correlations of content item characteristics in relation to user emotion reaction, wherein the analyzing includes performing NLP or sentiment analysis of user emotion reaction;

content wizard module for managing and optimizing content item publication, on the communication network by selecting content type based on based on NLP or sentiment analysis of content and emotion responses of a plurality of users, and determining a publication time schedule throughout a periodic time including at least one of time of day, or day of a week, or week of or a month of a year on the communication network based on user personal profile of emotion state in relation to schedule timing and determining exposure time on the communication network based on the emotion responses of the plurality of users wherein the optimization of selection of content type and estimation of optimal publication timing of content items is based on estimating engagement or rating of different types of content items, and estimating optimal content items publication exposure time period which determines how much time to keep each content item exposed to the users, based on emotion responses analysis in relation to content item characteristics, wherein the content items management is based on said estimation, wherein the exposure time period and publication time determine automatic scheduling of publishing of each content item including start and end time of publishing each content item which is optimized based on the content type and sentiment analysis of content and emotion responses of the users.

13. The system of claim 12 further comprising prediction module for predicting engagement and ads clicking rating of content items based on correlation of content items characteristics in relation to user emotional reaction, wherein the content items management is based on said predictions.

14. The system of claim 12 wherein the context analyzing module further comprises context text analysis of content items, identify trending topics, analyzing behavior patterns of different users in relation to common content items or article clusters and article clustering based on the context text analysis and behavior pattern analysis, wherein the content items management is based on said predictions.

15. The system of claim 12 further comprising prediction module for predicting time period of exposure of content of content item based on measured emotion in relation to content item characteristics reaction, wherein exposure period provides estimation to the content provider how much time to keep the content exposed to the user or promoting said content item, wherein the content items management is based on said predictions.

16. The system of claim 12 further comprising prediction module predicting user emotion reaction, where the users didn't provide such reaction based on analyzed emotion reactions to sequence of reading content items of other users, which expressed their emotion, wherein the content items management is based on said predictions.

17. The system of claim 12 further comprising prediction module for determining advertising type or/and advertising optimal publication time based on prediction of the emotional state or mood which predict adverting success rate based on measured user emotions.

* * * * *

UNITED STATES PATENT AND TRADEMARK OFFICE
CERTIFICATE OF CORRECTION

PATENT NO. : 11,068,926 B2
APPLICATION NO. : 15/275878
DATED : July 20, 2021
INVENTOR(S) : Eli Ken-Dror It is certified that error appears in the above-identified patent and that said Letters Patent is hereby corrected as shown below:

On the Title Page

Add item (60) as follows:
Related U.S. Application Data
(60) Provisional application No. 62/222,930, filed on September 24, 2015.

Signed and Sealed this
Twenty-first Day of February, 2023

Katherine Kelly Vidal
*Director of the United States Patent and Trademark Office*